US010844240B2

(12) United States Patent
Ashby et al.

(10) Patent No.: US 10,844,240 B2
(45) Date of Patent: Nov. 24, 2020

(54) HIGH REFLECTANCE COATING

(71) Applicant: SWIMC LLC, Cleveland, OH (US)

(72) Inventors: Larry W. Ashby, Russellville, KY (US); Deann K. Plummer, Bowling Green, KY (US); Kevin L. Marshall, Bowling Green, KY (US); Michelle J. Brownlee, Bowling Green, KY (US); Channing C. Beaudry, Bowling Green, KY (US)

( * ) Notice: Subject to any disclaimer, the term of this patent is extended or adjusted under 35 U.S.C. 154(b) by 0 days.

(21) Appl. No.: 16/067,996

(22) PCT Filed: Jan. 17, 2017

(86) PCT No.: PCT/US2017/013784
§ 371 (c)(1),
(2) Date: Jul. 3, 2018

(87) PCT Pub. No.: WO2017/127361
PCT Pub. Date: Jul. 27, 2017

(65) Prior Publication Data
US 2019/0218416 A1 Jul. 18, 2019

Related U.S. Application Data

(60) Provisional application No. 62/281,327, filed on Jan. 21, 2016, provisional application No. 62/281,388, filed on Jan. 21, 2016.

(51) Int. Cl.
| | | |
|---|---|---|
| *C09D 167/02* | (2006.01) | |
| *C09D 5/33* | (2006.01) | |
| *C09D 7/42* | (2018.01) | |
| *C09D 167/00* | (2006.01) | |
| *B32B 27/36* | (2006.01) | |
| *F21V 7/22* | (2018.01) | |
| *C09D 7/63* | (2018.01) | |
| *C09D 5/00* | (2006.01) | |
| *C08K 5/17* | (2006.01) | |
| *C08K 3/22* | (2006.01) | |
| *C08K 5/3492* | (2006.01) | |

(52) U.S. Cl.
CPC ............ *C09D 167/02* (2013.01); *B32B 27/36* (2013.01); *C09D 5/00* (2013.01); *C09D 5/004* (2013.01); *C09D 7/42* (2018.01); *C09D 7/63* (2018.01); *C09D 167/00* (2013.01); *F21V 7/22* (2013.01); *C08K 3/22* (2013.01); *C08K 5/17* (2013.01); *C08K 5/34922* (2013.01); *C08K 2003/2241* (2013.01)

(58) Field of Classification Search
CPC ........ C09D 167/02; C09D 7/42; C09D 5/004; C08K 3/22
See application file for complete search history.

(56) References Cited

U.S. PATENT DOCUMENTS

| | | | |
|---|---|---|---|
| 3,436,367 A | 4/1969 | McInerney | |
| 4,097,302 A | 6/1978 | Cohen et al. | |
| 4,520,188 A | 5/1985 | Holzrichter et al. | |
| 4,968,775 A | 11/1990 | Toman et al. | |
| 5,246,557 A | 9/1993 | Hughes et al. | |
| 5,688,598 A | 11/1997 | Keck et al. | |
| 6,350,821 B1 | 2/2002 | Alford | |
| 2005/0009943 A1 | 1/2005 | MacQueen et al. | |
| 2007/0048499 A1 | 3/2007 | Wu et al. | |
| 2011/0117292 A1 | 5/2011 | Wu et al. | |
| 2012/0048145 A1 | 3/2012 | Wang et al. | |
| 2014/0275396 A1 | 9/2014 | Chasser et al. | |
| 2015/0103529 A1* | 4/2015 | Cai | F21K 9/233 362/296.02 |
| 2015/0132521 A1 | 5/2015 | Amick et al. | |
| 2015/0203716 A1 | 7/2015 | Moravek et al. | |
| 2016/0297987 A1 | 10/2016 | Hayes et al. | |
| 2018/0265717 A1 | 9/2018 | Watanabe et al. | |
| 2018/0265730 A1 | 9/2018 | Watanabe et al. | |

FOREIGN PATENT DOCUMENTS

| | | |
|---|---|---|
| CN | 103189456 A | 7/2013 |
| EP | 1250380 A1 | 10/2002 |
| GB | 1222255 | 2/1971 |
| JP | 2009151143 | 7/2009 |
| WO | 0153387 | 7/2001 |
| WO | 2012059491 | 5/2012 |
| WO | 2013120922 | 8/2013 |
| WO | 2015094979 | 6/2015 |
| WO | 2016028300 | 2/2016 |
| WO | 2017/127429 A1 | 7/2017 |

OTHER PUBLICATIONS

Extended European search report for European patent application No. 17741812.6, dated Jul. 5, 2019 (7 pages).
International Search Report for international appl. No. PCT/US2017/013784, dated Apr. 26, 2017 (5 pages).
Written Opinion for international appl. No. PCT/US2017/013784, dated Apr. 26, 2017 (5 pages).
Extended European search report for European patent application No. 17741852.2, dated Jul. 5, 2019 (8 pages).
International Patent Application No. PCT/US2017/013784 filed Jan. 17, 2017, International Preliminary Report on Patentability dated Jul. 24, 2018, 6 pages.

(Continued)

*Primary Examiner* — Robert D Harlan

(57) ABSTRACT

A coating composition having excellent durability and high reflectance at very low gloss. The coating composition includes a binder system comprising at least a first resin component, optionally, one or more other resin components, a crosslinking component and a texture-producing component. Coated articles with the coating composition applied to at least a portion of a surface thereof are also provided.

15 Claims, No Drawings

(56) References Cited

OTHER PUBLICATIONS

International Patent Application No. PCT/US2017/013945 filed Jan. 18, 2017, International Preliminary Report on Patentability dated Jul. 24, 2018, 6 pages.
International Patent Application No. PCT/US2017/013945 filed Jan. 18, 2017, International Search Report and Written Opinion dated May 8, 2017, 11 pages.
Taiwan Patent Application No. 106101288 filed Jan. 13, 2017, Office Action dated Sep. 13, 2017, 18 pages. Translation included.
Taiwan Patent Application No. 106101287 filed Jan. 13, 2017, Office Action dated Sep. 13, 2017, 15 pages Translation included.

\* cited by examiner

HIGH REFLECTANCE COATING

CROSS REFERENCE TO RELATED APPLICATION(S)

This international application claims priority from U.S. Provisional Application No. 62/281,327, filed 21 Jan. 2016, and entitled "High Reflectance Coating," and U.S. Provisional Application No. 62/281,388, filed 21 Jan. 2016, and entitled "Coating with Metal Marking Resistance," each of which is incorporated by reference herein in its entirety.

BACKGROUND

Polymer coating compositions are routinely applied to substrates, especially metal substrates. Such coatings are used for a variety of reasons, including, for example, to protect the substrate from degradation, to beautify the substrate (e.g., to provide color, brightness, etc.), and/or to reflect light.

Many such polymer coating compositions are applied on planar substrates (e.g., using coil coating processes) that are subsequently formed into finished articles, including articles used as exterior building materials, for light fixtures, and the like. The coating must also maintain a suitable aesthetic appearance (gloss, color, and the like) over prolonged periods of exposure to various conditions, including light, humidity, rain, fluctuating temperatures, and the like.

Coil-coated parts may be used to make reflective surfaces. Typically, when such parts are used in a light fixture, the reflective surface is a high gloss white coating or a specular silver coating. Such surfaces provide high levels of reflectance but also produce high levels of glare which ultimately reduces the usability of these coatings.

Accordingly, there is a continuing need for coil coatings and coil coated parts that can provide high reflectance but provide significantly reduced glare when used in light fixtures.

SUMMARY

In one embodiment, the present description provides a cured coating formed from a coating composition that demonstrates high reflectivity and low gloss. The coating composition includes a binder system that comprises at least a first binder resin component. The coating composition may include other ingredients, including one or more of the following: (i) a crosslinking agent, (ii) a catalyst, (iii) one or more light-scattering components, (iv) pigments, (v) a texture-producing additive, and/or (vi) a flow agent, among other components. The composition forms a low gloss coating with a 60° gloss rating of about 5, and reflectance of at least about 90%.

In another embodiment, the present description provides coated articles, typically metal substrates, having disposed on at least a portion of the substrate a cured coating formed from the coating composition described herein.

In yet another embodiment, the present invention provides a method of producing an article from a metal substrate, wherein the substrate has, disposed on at least a portion of its surface, a cured coating formed from the coating composition described herein.

Definitions

Unless otherwise specified, the following terms as used herein have the meanings provided below.

Substitution is anticipated on the organic groups of the polyesters and other polymeric resins used in the coating compositions described herein. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. The term "hydrocarbyl moiety" refers to unsubstituted organic moieties containing only hydrogen and carbon. As used herein, the term "group" is intended to be a recitation of both the particular moiety, as well as a recitation of the broader class of substituted and unsubstituted structures that includes the moiety.

The term "crosslinker" refers to a molecule capable of forming a covalent linkage between polymers or between two different regions of the same polymer.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers). Similarly, unless otherwise indicated, the use of a term designating a polymer class such as, for example, "polyester" is intended to include both homopolymers and copolymers (e.g., polyester-urethane polymers).

The term "unsaturation" when used in the context of a compound refers to a compound that includes at least one double bond that is not present in an aromatic ring.

As used herein, the term "silicone" refers to polymerized siloxanes or polysiloxanes, which are mixed inorganic-organic polymers with the general structural formula $[R_2SiO]n$, where R is substituted or unsubstituted C1-C12 alkyl, C1-C12 alkoxy, C6-C10 aryl, and the like. As used herein, the silicone is a hydroxy-functional or alkoxy-functional polysiloxane.

The term "comprises" and variations thereof do not have a limiting meaning where these terms appear in the description and claims.

As used herein, the term "reflectance" refers to the percentage of light at normal incidence that is reflected back to the observer from the surface of a coated article or part at a specified wavelength of light.

"Soft touch" or "soft to the touch," as used herein refers to a coated surface with a low gloss velvet-like appearance that simulates the sense of touch. The terms are used interchangeably herein with the term "tactile" or "tactile feel."

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

In one embodiment, the present description provides a cured coating formed from a thermosetting coating composition that exhibits high reflectivity and low gloss. The coating composition typically comprises a binder system, a crosslinking agent, a catalyst, a flow agent, one or more pigments, and a light-scattering component, along with a texturing additive. The binder system preferably includes at least a first resin component, and optionally, one or more additional resin components. Preferably, the coating composition includes at least a film-forming amount of the binder system. Although coating compositions including a liquid carrier are presently preferred, it is contemplated that the composition described herein may have utility in other coating application techniques such as, for example, powder coating, extrusion, or lamination.

The binder system described herein includes at least a first resin component. The first resin component is preferably a polyester resin, more preferably a durable polyester resin. Suitable polyesters include, for example, resins formed by reaction of compounds having reactive functional groups such as, for example, compounds with hydroxyl, carboxyl, anhydride, acyl, or ester functional groups. Hydroxyl functional groups are known to react, under proper conditions, with acid, anhydride, acyl or ester functional groups to form a polyester linkage. Suitable compounds for use in forming the polyester resin include mono-, di-, and multi-functional compounds. Di-functional compounds are presently preferred. Suitable compounds include compounds having reactive functional groups of a single type (e.g., mono-, di-, or poly-functional alcohols or mono-, di-, or poly-functional acids) as well as compounds having two or more different types of functional groups (e.g., a compound having both an anhydride and an acid group, or a compound having both an alcohol and an acid group, etc.). The binder system may include one or more additional resin components that are the same as, or different from, the first resin component.

In an embodiment, the binder system includes a second polyester resin component in addition to the first resin component. The second polyester resin component is preferably a silicone-modified or siliconized polyester resin. Suitable siliconized polyesters include those formed by the reaction of silicone-functional compounds with compounds having other reactive functional groups such as, for example, compounds with hydroxyl, carboxyl, anhydride, acyl, or ester functional groups. Suitable silicone-functional compounds include, for example, polymerized siloxanes (also known as organo-siloxanes or organic polysiloxanes) of the general formula $[R_2SiO]_n$, where R is typically C1-C12 alkyl (preferably methyl or ethyl), C1-C12 alkoxy (preferably methoxy or ethoxy), aryl (preferably phenyl), and the like. In an aspect, the polymerized siloxanes include reactive functional groups, such as hydroxyl groups, alkoxy groups, silanol groups, and the like. Preferred siliconized polyesters as used herein are further described in Applicants' co-pending international application, PCT/US2014/070096, filed Jan. 9, 2015.

If the binder system described herein includes siliconized polyester, the amount of siliconized polyester is preferably about 5 to 60 wt %, more preferably about 10 to 55 wt %, based on the total weight of the binder system.

The amount of the binder system in the coating composition described herein is preferably about 1 to 65 wt %, more preferably about 15 to 50 wt %, and most preferably about 20 to 40 wt %, based on the total weight of the coating composition. The amount of binder used in the composition will vary depending on the resin component(s) selected.

In an embodiment, the coating composition further includes a crosslinker or crosslinking agent. The crosslinker may be used to facilitate cure of the coating and to build desired physical properties. When present, the amount of crosslinker will vary depending upon a variety of factors, including, e.g., the intended end use and the type of crosslinker. Typically, one or more crosslinkers will be present in the coating composition in an amount greater than about 0.01 wt-%, more preferably from about 5 wt % to about 50 wt %, even more preferably from about 10 wt % to about 30 wt %, and most from about 15 wt % to about 20 wt %, based on total weight of resin solids.

Polyesters having hydroxyl groups are curable through the hydroxyl groups. Suitable hydroxyl-reactive crosslinking agents may include, for example, aminoplasts, which are typically oligomers that are the reaction products of aldehydes, particularly formaldehyde; amino- or amido-group-carrying substances exemplified by melamine, urea, dicyandiamide, benzoguanamine and glycoluril; blocked isocyanates, or a combination thereof.

Suitable crosslinkers include aminoplasts, which are modified with alkanols having from one to four carbon atoms. It is suitable in many instances to employ precursors of aminoplasts such as hexamethylol melamine, dimethylol urea, hexamethoxymethyl melamine, and the etherified forms of the others. Thus, a wide variety of commercially available aminoplasts and their precursors can be used. Suitable commercial amino crosslinking agents include those sold by Cytek under the tradename CYMEL (e.g., CYMEL 301, CYMEL 303, and CYMEL 385 alkylated melamine-formaldehyde resins, or mixtures of such resins, are useful) or by Solutia under the tradename RESIMENE.

Suitable crosslinkers may also include blocked isocyanates, such as, for example, as described in U.S. Pat. No. 5,246,557. Blocked isocyanates are isocyanates in which the isocyanate groups have reacted with a protecting or blocking agent to form a derivative that will dissociate on heating to remove the protecting or blocking agent and release the reactive isocyanate group. Some examples of suitable blocking agents for polyisocyanates include aliphatic, cycloaliphatic or aralkyl monohydric alcohols, hydroxylamines and ketoximes. Presently preferred blocked polyisocyanates dissociate at temperatures of around 160° C. The presence of a catalyst is preferred to increase the rate of reaction between the liberated polyisocyanate and the active hydrogen-containing compound (e.g., a hydroxyl-functional polyester). The catalyst can be any suitable catalyst such as, for example, dibutyltin dilaurate or triethylene diamine.

Suitable crosslinkers also include unblocked isocyanates. Unblocked isocyanates are difunctional or polyfunctional isocyanates with free isocyanate groups attached to aliphatic, cycloaliphatic, aryl, araliphatic and/or aromatic moieties. Examples include, without limitation, tetramethylene diisocyanate, hexamethylene diisocyanate, dodecamethylene diisocyanate, 1,4-diisocyanatocyclohexane, 3,5,5-trimethylcyclohexyl isocyanate, isophorone diisocyanate, and the like.

In some embodiments, an ultraviolet curing crosslinker or an electron-beam curing crosslinker may be suitable. Examples of suitable such crosslinkers may include 1,6-hexanediol diacrylate, 1,4-butanediol diacrylate, trimethylolpropane triacrylate, or mixtures thereof.

The coating composition described herein may be produced by conventional methods known to those of skill in the art. In an embodiment, the coating composition is prepared by use of a polymerization or processing aid, such as a catalyst, for example. Suitable processing aids include, without limitation, metal catalysts (e.g., stannous oxalate, stannous chloride, butylstannoic acid, dibutyltin oxide, tetrabutyltitanate, or tetra butylzirconate), antioxidants (e.g., hydroquinone, monotertiarybutyl-hydroquinone, benzoquinone, 1,4-napthoquinone,2,5-diphenyl-p-benzoquinone, or p-tert butylpyrocatechol), unblocked and blocked acid catalysts (e.g., dinonylnaphthalene sulfonic acid, dinonylnaphthalene disulfonic acid, dodecyl benzene sulfonic acid, p-toluene sulfonic acid, phosphate esters, and mixtures or combinations thereof), and mixtures thereof. The amount of catalyst depends on the amount and nature of the reactants, but is up to about 5 wt %, preferably up to about 2 wt %, based on the total weight of resin solids.

Other additives known in the art may be included in the coating composition described herein. These additives include, without limitation, flatting agents, flow or viscosity modifiers, texture-providing additives, waxes and/or other binders that may be included or dispersed in the coating composition.

In an embodiment, the coating described herein is a very low gloss coating. Such low gloss coatings are useful as they cover imperfections on substrate surfaces and may help reduce or eliminate glare when used in reflectors, light fixtures, and the like, for example. In a preferred aspect, a cured coating formed from the composition described herein demonstrates specular 60° gloss (as measured by a handheld gloss meter) of about 10, preferably 1 to 5, more preferably, less than 5.

Conventionally, low gloss coatings are prepared by including one or more flatting agents in the coating composition. Suitable flatting agents include, for example, silica, silica-based materials, or other materials with particles known to provide easy dispensability. The amount of flatting agent depends on the desired gloss or reflectivity of the cured coating. A typical low gloss coating composition may include up to about 6 wt %, preferably 1 to 5 wt %, of a silica or silica-based flatting agent, based on the total weight of resin solids in the composition.

However, to produce coatings with 60° gloss as low as described herein, i.e. preferably less than 5, a coating composition would have to include a significant excess of flatting agent, and at such high flatting agent levels, the beneficial mechanical properties of the composition would be lost.

Surprisingly, the composition described herein demonstrates very low 60° gloss, but does not include a significant excess of flatting agent and shows no loss in beneficial mechanical properties. In an embodiment, the compositions described herein produce very low gloss cured coating as a result of forming a microtextured or microwrinkled surface topography. Without limiting to theory, this microwrinkled surface topography is believed to cause diffused reflection as a result of light scattering and subscattering from the irregular surface of the coating.

To form a microtextured or microwrinkled coating surface, the coating composition described herein includes a texture-producing additive intended to produce a microwrinkled surface when the coating is cured. Accordingly, in an embodiment, the coating composition described herein includes an amine additive to produce the microwrinkled surface topography. Without limiting to theory, it is believed that the amine tends to volatilize as the coating composition is cured and surface wrinkles are formed as a result.

In an embodiment, the texture-producing additive is an amine having the general formula (I):

$$NR^1R^2R^3 \qquad (I)$$

In formula (I) $R^1$, $R^2$, and $R^3$ may each independently be —H; unsubstituted C1-C10 alkyl; substituted C1-C10 alkyl, wherein the substituents include C1-C10 alkyl, alkenyl, aryl, halide, hydroxyl, and the like; unsubstituted and substituted C4-C10 branched alkyl; unsubstituted aryl; substituted aryl, wherein the substituents include C1-C10 alkyl, alkenyl, aryl, halide, hydroxyl, and the like; C1-C10 ketone; C1-C10 aldehyde; C1-C10 ether; aryl ketone; aryl aldehyde; aryl ether; and the like, and mixtures or combinations thereof.

In an embodiment, the coating composition described herein includes the amine additive in an amount of preferably about 0.001 to 5 wt %, more preferably 0.1 to 2 wt %, based on the total weight of the composition.

In an embodiment, the coating composition described herein includes one or more light scattering agents or components. Such agents are typically porous materials in the form of particles having particle size of at least about 100 µm, preferably 120 to 150 µm, more preferably 160 to 180 µm. Suitable examples of light scattering components include, without limitation, polymeric particles, macroporous polymeric particles, macroporous pigment particles, pigment particles, glass flake, metallic flake, mica, and the like. In a preferred aspect, the light scattering component may be a pigment, preferably titania ($TiO_2$) in rutile or anatase form.

The color of the coated article or surface depends on the pigment used. For example, if the coating composition includes $TiO_2$ as the pigment and light scattering agent, the resultant coating is a bright white coating.

In an aspect, the pigment and/or light scattering component is preferably dispersed in the siliconized polyester component or in the melamine crosslinking agent of the coating composition. In another aspect, commercially available tint pastes may be used or combined with other pigments and incorporated into the coating composition to achieve the desired color or shade. In yet another aspect, the one or more pigments described herein may be light scattering components.

In some embodiments, the pigment:binder weight ratio of the coating composition is preferably at least 0.02:1 to about 1.4:1. In certain embodiments, the pigment:binder weight ratio does not exceed about 1.4:1.

In an embodiment, the coating composition described herein includes one or more flow modifiers. These flow or viscosity modifiers are typically used to aid in air release and improve the flow of the composition to allow for application to a substrate. Suitable flow modifiers include, for example, silicone-based compounds, metal salts of aromatic carboxylic acids (e.g., unsubstituted salicylic acid, unsubstituted naphthoic acid, alkyl- or aralkyl-substituted salicylic acid, alkyl- or aralkyl-substituted naphthoic acid, and the like), metal salts of aromatic hydroxy-functional carboxylic acids (e.g., 2-hydroxy-3-naphthoic acid, alkyl-substituted 2-hydroxy-3-naphthoic acid, and the like), and the like. In a preferred aspect, the flow modifier is a silicone-based compound and is present in an amount of about 1 wt %, preferably 0.01 to 0.5 wt %, based on the total weight of resin solids in the composition.

In an embodiment, the coating composition described herein includes one or more waxes. The wax is typically used to aid in handling of the coating composition prior to application, and may also be used to reduce or prevent abrasion of the cured coating. Suitable waxes include, for example, naturally occurring waxes (e.g., carnauba and the like), polymeric waxes (e.g., polyethylene-polyvinyl acetate wax, polyethylene glycol wax, and the like), etc. In a preferred aspect, the coating composition described herein includes a polymeric wax, such as PTFE wax or polyethylene wax, and the wax is present in amount of up to about 15 wt %, preferably about 1.5 to 10 wt %, based on the total weight of resin solids in the composition.

The total amount of solids present in the coating composition described herein may vary depending upon a variety of factors including, for example, the desired method of application. For coil coating applications, the coating composition will typically include from about 30 to about 65 wt % of solids. In some embodiments, the coating composition may include as much as 80 wt % or more of solids.

In an embodiment, the coating composition described herein provides a cured coating with a soft touch or tactile feel. Without limiting to theory, the microwrinkled or microtextured surface topography provides a very low gloss surface that simulates the sense of touch.

Preferred cured coating compositions of the invention have excellent adhesion, hardness, flexibility, and demonstrate high reflectance. The combined properties of low gloss and increased reflectance provide a significant advantage over existing technologies, particularly in reducing or eliminating the amount of glare when the coating is used in a reflector, lighting fixture, or the like.

Conventionally, in order to maximize usable light, lighting fixtures are designed to reflect and redirect light in a specific direction while limiting the amount of light absorbed by the fixture or parts of the fixture, such as a reflector, for example. Typically, a high gloss coating is applied to reflective surfaces of the fixture, and often, the coating has a bright white or specular silver appearance. Such a coating is typically smooth, high gloss, and has sufficient specular reflectance to maximize the usable light, thereby improving lighting efficiency. Specular reflectance occurs when incident light is reflected at the same angle as the incident light. Light is thereby directed out of the light fixture in a controlled manner. In certain situations, however, specular reflectance produces significant glare, and reduces the lighting efficiency and usability of the lighting fixture.

Surprisingly, the coating described herein is a bright white coating having high reflectance but very low gloss. Without limiting to theory, this is because of the highly Lambertian scattering surface provided by the coating described herein. The microtextured or microwrinkled nature of the coating presents a near-ideal matte or diffusely reflecting surface where all parts of the surface reflect light equally in all directions. As a result, the coating demonstrates high reflectance but without a high level of specular gloss seen with conventional coatings. Glare from the coated surface is significantly reduced or eliminated, maximizing usable light.

Accordingly, in an embodiment, a cured coating derived from the coating composition described demonstrates reflectance of greater than 85%, preferably about 90%, more preferably about 93%, as measured using the CapY method on a Hunter Lab Scan instrument.

The coating composition described herein, when applied to a substrate and cured, preferably demonstrates durability and high reflectance at low gloss. Without limiting to theory, this is believed to be a result of the microwrinkled surface topography of the coating. This leads to a Lambertian scattering surface or diffusely reflecting surface, and in combination with a light scattering component, provides a bright white, high reflectance, low gloss coating that demonstrates significant reduction or elimination of glare from the coating.

In addition to durability and high reflectance, the cured coating described herein may also demonstrate other useful performance characteristics such as, for example, pencil hardness, flexibility, high reflectance, and the like.

The coating composition described herein may be applied by a variety of methods known to those of skill in the art. In an embodiment, the composition is applied to planar metal surfaces using a coil coating process. The coating is preferably applied as a thin film, with thickness in the range of preferably 0.1 to 5 mil, more preferably 0.5 to 2 mil, and even more preferably about 1 to 1.2 mil.

The coating composition has utility in a multitude of applications. The coating composition of the invention may be applied, for example, as an intermediate coat, as a topcoat, or any combination thereof. The coating composition may be applied to sheet metal such as is used for lighting fixtures, (e.g., reflectors, luminaries, signage, daylight applications and the like), architectural metal skins (e.g., gutter stock, window blinds, siding and window frames and the like) by spraying, dipping, or brushing, but is particularly suited for a coil coating operation where the composition is applied onto the sheet as it unwinds from a coil and then baked as the sheet travels toward an uptake coil winder. It is further contemplated that the coating composition of the invention may have utility in a variety of other end uses, including, industrial coating applications such as, e.g., appliance coatings; packaging coating applications; interior or exterior steel building products; HVAC applications; agricultural metal products; wood coatings; etc. In a preferred aspect, the cured coating described herein is used as an interior coating for lighting fixtures and the like.

Non-limiting examples of metal substrates that may benefit from having a coating composition of the invention applied on a surface thereof include hot-rolled steel, cold-rolled steel, hot-dip galvanized, electro-galvanized, aluminum, tin plate, various grades of stainless steel, and aluminum-zinc alloy coated sheet steel (e.g., GALVALUME sheet steel).

The coating is typically cured or hardened in a heated temperature environment of from about 200 to 500° C., more preferably from about 270 to 470° C. For coil coating operations, the coating is typically baked for 8 to 25 seconds, to a peak metal temperature (PMT) of from about 200 to 250° C.

EXAMPLES

The present invention is illustrated by the following examples. It is to be understood that the particular examples, materials, amounts, and procedures are to be interpreted broadly in accordance with the scope and spirit of the invention as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Example 1

Preparation of Coating Compositions

Coating compositions (#1 through #3) as shown in Table 1 were prepared by combining a binder system including a polyester resin with a melamine curing agent. The resin and crosslinking agent were blended together using standard mixing techniques known in the art, along with $TiO_2$ pigment, and minimum levels of flow agents to facilitate air release during the coil coating process. A flatting agent is included to provide either high gloss (coating #1) or low gloss (coating #2). For coating #3, a texture-providing amine additive is included to produce a very low gloss coating. The coating compositions were combined with one or more pigments to produce coatings as shown in Table 1. The coating compositions were applied to metal panels using standard application methods, and baked at peak metal temperatures of about 200° to 250° C.

TABLE 1

Coating Compositions

| Coating | Gloss |
|---------|-------|
| 1 | High (white) |
| 2 | Low (white) |
| 3 | Very low (white) |

Example 2

Performance Testing

Reflectivity and Gloss

The coating compositions of Example 1 were applied to test panels and baked to form cured coatings. Gloss ratings for each panel were measured at a 60° angle with a handheld gloss meter (Byk Gardener), and reflectance was measured using a Hunter Lab Scan instrument using the CapY method. Gloss ratings and reflectance values were observed as shown in Table 2.

TABLE 2

Performance Testing

| Coating | Gloss | Reflectance |
|---------|-------|-------------|
| 1 | 99 | 91% |
| 2 | 11.8 | 89-90% |
| 3 | 3.5 | 93% |

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

What is claimed is:

1. A coated article comprising
   a substrate; and
   a cured coating disposed on the substrate, wherein the cured coating is derived from a coating composition comprising:
   a binder resin component;
   a crosslinking component;
   an amine-functional texture-producing component having the general formula (I):

$$NR'R^1R^2R^3 \qquad (I),$$

wherein $R^1$, $R^2$, and $R^3$ may each independently be —H; unsubstituted C1-C10 alkyl; substituted C1-C10 alkyl; unsubstituted and substituted C4-C10 branched alkyl; unsubstituted aryl; substituted aryl; C1-C10 ketone; C1-C10 aldehyde; C1-C10 ether; aryl ketone; aryl aldehyde; aryl ether; and mixtures or combinations thereof; and
   a light-scattering component,
   wherein the cured coating has reflectance of at least about 90% and 60° gloss of about 5 or less.

2. The article of claim 1, wherein the binder resin component is a polyester resin.

3. The article of claim 1, wherein the binder resin component is a silicone-modified polyester resin.

4. The article of claim 1, wherein the crosslinking component is a hydroxyl-reactive crosslinker.

5. The article of claim 1, wherein the crosslinking component is an amine-functional crosslinker.

6. The article of claim 1, wherein the crosslinking component is selected from an aminoplast, an amino- or amido-group carrying substance, a blocked isocyanate, or a combination thereof.

7. The article of claim 1, wherein the cured coating demonstrates tactile effect.

8. The article of claim 1, wherein the cured coating has a microtextured surface.

9. The article of claim 1, wherein the light-scattering component is a macroporous pigment.

10. The article of claim 1, wherein the light-scattering component is $TiO_2$.

11. The article of claim 1, wherein the article is a light fixture comprising a reflector and a light source.

12. The article of claim 1, wherein the article is a light fixture comprising a reflector and a light source, the reflector comprising the substrate with the cured coating applied thereon at a film thickness of about 1 to 1.2 mil and having a reflectance of about 90%.

13. The article of claim 1, wherein the article is a light fixture comprising a reflector and a light source, the reflector comprising the substrate with the cured coating applied thereon at a film thickness of about 1.5 to 1.7 mil at a reflectance of about 93%.

14. The article of claim 1, wherein the cured coating formed from the composition has 60° gloss of less than 5.

15. The article of claim 1, wherein the cured coating formed from the composition demonstrate reduced glare.

* * * * *